Patented Sept. 14, 1948

2,449,209

UNITED STATES PATENT OFFICE 2,449,209

METHOD FOR IMPROVING CHEMICAL REACTIVITY AND ADSORPTIVE CAPACITY OF LIGNIN FROM WOOD SACCHARIFICATION

Eduard Farber and Mathew Sciascia, Washington, D. C., assignors to Timber Engineering Company, Washington, D. C., a corporation of Delaware No Drawing. Application June 12, 1947, Serial No. 754,274

3 Claims. (Cl. 260—124)

The present invention relates to a method for improving the chemical reactivity and adsorptive capacity of lignin from wood saccharification.

In the process of saccharifying wood the carbohydrates contained in the wood are converted into soluble sugars in a process called hydrolysis carried out usually with strong mineral acids.

The lignin with which the method of the present invention is concerned represents the solid residue from the wood obtained by dissolving and removing the carbohydrate portions of the wood during saccharification by the action of acids. These acids may be either dilute mineral acids employed at relatively high temperatures or more concentrated mineral acids employed at lower temperatures. The saccharification process yields a solid residue, practically free of carbohydrates, which is different in character from lignin as it occurs in the natural state. The lignin from wood saccharification has lost methoxyl and has undergone certain condensation reactions. It is inert toward many chemicals, and, therefore, of little value as a chemical reagent. It is furthermore relatively inefficient as an adsorbent or coagulating agent.

The present invention has as its object and purpose the conversion of lignin from wood saccharification into a physically and chemically more reactive and valuable form. Generally speaking, the purposes of the invention are achieved by digesting lignin from wood saccharification with a relatively dilute solution of an alkaline substance in water, at a temperature within the range between 20° C. and 100° C.

When lignin from wood saccharification is mixed with a dilute solution of alkali, for example, sodium hydroxide or potassium hydroxide, it swells considerably and releases small amounts of dark colored soluble substances. In the resulting swollen form it is found that the lignin takes up large amounts of water and offers great resistance to ordinary filtration. When the lignin from wood saccharification is treated with a sodium hydroxide solution having a concentration of about 1% in aqueous solution, the swelling action of the lignin is very pronounced. When the concentration of the sodium hydroxide in the aqueous solution is increased substantially above 1% the swelling of the lignin is accompanied by a form of gellation. This gellation occurs to a very substantial extent at alkali concentrations of the order of 5% in the aqueous solution and appears to reach a maximum at alkali concentrations of about 7%. Solutions having a higher concentration of alkali produce a greater coagulating effect, apparently due to osmotic action. When employing a solution having an alkali concentration of 12% most of the lignin particles tend to cohere, although they offer little resistance to dispersion. It may, therefore, be pointed out that practical operative limits of the present invention embrace the employment for the digestion of the lignin from wood saccharification of an alkali solution having a concentration within the range of from 1% to 12%, with concentrations of 5% to 7% being preferred.

While it is quite difficult to remove the excess water from the swollen lignin by ordinary filtration or decantation, it has been found that through the addition of small amounts of water-soluble salts having alkali-insoluble cations, a change in the colloidal behavior of the treated lignin occurs and the removal of the free water is made easy. The treated lignin retains its modified character, which persists even after water washing and drying.

The alkali modified lignin from wood saccharification produced in accordance with the present invention possesses very definitely increased chemical reactivity. For example, the reaction of this lignin with dilute nitric acid occurs much more readily and at lower temperatures and with the employment of far less excess of nitric acid than will reactions employing the original untreated lignin. Additionally, the alkali modified lignin from wood saccharification produced in accordance with the present invention is particularly active as an adsorbent for various organic and inorganic substances, being particularly effective in the adsorption of phenol from aqueous solutions.

The following may be given by way of illustrations:

*Example 1.*—100 grams of lignin obtained from wood saccharification with dilute sulphuric acid under pressure and high temperature and containing traces of residual acid and other impurities was digested in the solution of 5 grams of sodium hydroxide in 400 grams water. At room temperature the mixture was left for about 12 hours and then diluted with one liter of water. Upon addition of 2 grams of calcium chloride the lignin settled out satisfactorily so that a good part of the solution could be removed by decanting. Filtration to separate the lignin more completely from the solution of alkali and extractives was rapid. The pressed and washed lignin weighed 270 grams, indicating the high water-holding capacity of this lignin even after all free alkalies had been removed. This lignin was used to absorb phenol from a technical waste water containing 0.35% free phenol. 10.8 grams of the treated lignin product (representing 4 grams on a dry weight basis of the original lignin) which had been prepared pursuant to this example reduced the phenol content of one liter of the phenol solution to 0.24%. Considered from a dry lignin basis, therefore, the adsorptive capacity for phenol was 275 milligrams per gram of dry lignin, whereas the untreated lignin employed in this example had an adsorptive capacity of only about 60 milligrams per gram of the dry lignin.

Example 2.—In this example, 100 grams of crude spruce lignin, obtained from wood saccharification with sulphuric acid, were added to a water solution representing 400 grams of water to which had been added 20 grams of sodium hydroxide. Further water, in the amount of 300 grams, was added to increase fluidity of the mass and the charge was then digested at about 90° C. for one hour, at which time most of the lignin formed a loosely cohering gel. The mixture was diluted with 2 liters of clear lime water and there was added 10 grams of concentrated hydrochloric acid, yielding calcium chloride in situ, whereupon the lignin settled out rapidly. After filtering and water washing, this lignin showed a phenol adsorption value of about 250 milligrams per gram of dry lignin.

Example 3.—In this example, 100 grams of lignin produced by saccharifying Douglas fir with dilute mineral acid, and containing approximately 6% of residual carbohydrates, was added to an aqueous solution of sodium hydroxide comprising 600 grams of water to which had been added 40 grams of sodium hydroxide. The mix was digested for one hour at a temperature of approximately 60° C., at the end of which time it was diluted with two liters of water. It required 15 grams of calcium chloride to effect rapid coagulation of the lignin into a readily filterable form. The product of this example had a phenol adsorption value above 250 milligrams per gram of dry lignin.

Example 4.—In this example the same lignin from saccharification of Douglas fir was employed as was used in Example 3. The only difference in the procedure of this example and that of Example 3 resides in the fact that in the present example, 80 grams of sodium hydroxide were employed, giving a solution having a concentration in the neighborhood of 12%. The lignin product so produced was similar in appearance to the product of Example 3, however, substantially larger amounts of calcium chloride were required for precipitation than where more dilute alkali solutions were employed.

The filtrates from these solutions are found to contain small amounts of dissolved lignin-like substances which are insoluble in moderately acid solutions and form insoluble calcium salts.

The increased physical activity of the treated lignin product is shown by its increased adsorptive capacity for phenol. Original untreated lignin from wood saccharification has an adsorptive capacity for phenol usually lying within the range of from 60 to 80 milligrams per gram of dry lignin, whereas the alkali modified lignins produced according to the present invention have a phenol adsorptive value ranging from 200 to 400 under otherwise the same conditions and with equilibrium concentrations of phenol of about 0.2%.

The increased chemical reactivity of the alkali modified lignin from wood saccharification produced according to the present invention is apparent in its reaction with nitric acid. For example, 50 grams of the modified lignin of Example 3 above, when mixed in 400 grams of water will react readily and completely when 50 grams of nitric acid are added to the solution. In this reaction of the alkali modified lignin with nitric acid of about 11% concentration, nitro-lignin in high yield is obtained at room temperature. When employing nitric acid of about 7% concentration, the alkali modified lignin will begin to react at temperatures as low as 25° C. to 40° C. with complete conversion into nitro-lignin and degradation products. Much higher concentrations of acid are required to effect any very substantial reaction with the untreated lignin.

From the foregoing it will be observed that through the method of the present invention it is possible to greatly improve the chemical reactivity and adsorptive capacity of the lignin from wood saccharification.

The product of the present invention has particular utility in the field of water and industrial waste purification.

Having thus described our invention, what we claim is:

1. The method for improving the chemical reactivity and adsorptive capacity of lignin from wood saccharification comprising digesting such lignin with a solution of an alkali hydroxide having a concentration within the limits of from about 1% to about 12% alkali hydroxide at a temperature between 20° C. and 100° C., and thereafter separating the treated lignin from the alkali hydroxide.

2. The method for improving the chemical reactivity and adsorptive capacity of lignin from wood saccharification comprising digesting such lignin with a solution of an alkali hydroxide having a concentration within the limits of about 1% and about 12% alkali hydroxide at a temperature between 20° C. and 100° C., thereafter adding a small amount of a water soluble salt of calcium and separating the treated lignin from the alkali hydroxide.

3. The method for improving the chemical reactivity and adsorptive capacity of lignin from wood saccharification comprising digesting such lignin with a solution of an alkali hydroxide having a concentration of between 1% and 12% alkali hydroxide at a temperature between 20° C. and 100° C., thereafter adding a small amount of a water soluble salt of calcium to facilitate separation of water from the lignin, precipitating the lignin and water washing the same to free it from alkali hydroxide.

EDUARD FARBER.
MATHEW SCIASCIA.

REFERENCES CITED

The following references are of record in the file of this patent:

UNITED STATES PATENTS

| Number | Name | Date |
|---|---|---|
| 1,899,526 | Phillips | Feb. 28, 1933 |
| 2,166,540 | Bailey | July 18, 1939 |
| 2,217,787 | Birt et al. | Oct. 15, 1940 |
| 2,317,136 | Harmon | Mar. 13, 1945 |